United States Patent [15] 3,706,946

Bickford et al. [45] Dec. 19, 1972

[54] DEVIATION MODIFIER

[72] Inventors: William J. Bickford, Weston; Richard G. Cease, Westwood, both of Mass.

[73] Assignee: Raytheon Company, Lexington, Mass.

[22] Filed: Oct. 26, 1970

[21] Appl. No.: 84,126

Related U.S. Application Data

[63] Continuation of Ser. No. 846,854, Aug. 1, 1969, abandoned.

[52] U.S. Cl. ........................332/23, 328/103, 329/50, 329/145, 332/48

[51] Int. Cl. ..............................................H03c 3/06

[58] Field of Search..........332/19, 18, 23, 48, 37, 38; 329/50, 145, 146; 328/60, 61, 103, 104, 105, 133, 134; 325/147, 347

[56] References Cited

UNITED STATES PATENTS

| | | | |
|---|---|---|---|
| 2,558,100 | 6/1951 | Rambo | 329/112 X |
| 2,580,148 | 12/1951 | Wirkler | 329/146 |
| 3,189,826 | 6/1965 | Mitchell et al. | 328/133 X |
| 3,005,165 | 10/1961 | Lenigan | 328/133 X |
| 3,514,719 | 5/1970 | Rhodes | 332/48 X |
| 3,517,338 | 6/1970 | Herman et al. | 332/23 X |

*Primary Examiner*—Alfred L. Brody
*Attorney*—Harold A. Murphy and Joseph D. Pannone

[57] ABSTRACT

A deviation modifier which utilizes the principle of synthetic phase isolation to extend or reduce the deviation on an incoming F.M. or P.M. signal. The modified deviation signal is then filtered and demodulated or interfaced at IF. This modifier permits IF interfacing of signals without demodulation and remodulation and IF demodulated provides threshold extension.

7 Claims, 6 Drawing Figures

INVENTORS
WILLIAM J. BICKFORD
RICHARD G. CEASE
BY Irving S. Rappaport
ATTORNEY

INVENTORS
WILLIAM J. BICKFORD
RICHARD G. CEASE
BY Irving S. Rappaport
ATTORNEY

DEVIATION MODIFIER

This is a continuation of Serial No. 846,854, filed 8/1/69 now abandoned.

BACKGROUND OF THE INVENTION

To obtain the maximum in performance from high deviation F.M. or P.M. systems, it is frequently desirable to extend the threshold of the system demodulator below what is possible using conventional F.M. demodulation techniques. Several methods for doing this have been advanced, notably F.M.F.B. and phase-locked demodulators. Both of these techniques operate by effectively filtering the IF signal at a bandwidth narrower than permissible with a conventional demodulator system.

The present invention for extending F.M. or P.M. threshold may reduce or extend the deviation on an incoming F.M. or P.M. signal by the use of the synthetic phase isolation (SPI) principle. Threshold extension occurs only when the device is used as a deviation reducer, however, the device can also be used as a deviation expander for other purposes such as IF interfacing. This principle is described in copending application Ser. No. 562,375 filed on July 1, 1966 now U.S. Pat. No. 3,471,788 and entitled "Synthetic Phases Isolator". The reduced deviation signal is then passed through a filter and then into a conventional demodulator. This method as well as any other method of F.M. or P.M. threshold extension works only on high deviation signals, since the minimum bandwidth of a system is two times the information rate, and if any advantage is to be obtained from deviation reduction, the deviation ratio must be fairly large.

The technique of the present invention developed from the desire to use the regenerative synthetic phase isolator technology in a "threshold extension" F.M. receiver. The correlation bandwidth of this regenerative arrangement is under control of the designer as is the ratio of the time delay (slope of the phase characteristic). The noise bandwidth of the deviation reducer can be small, as in the conventional threshold extension receivers, without paying as great a penalty in signal distortion and capture. This is because the signal processor does not need to employ a saturating circuit such as a limiter, discriminator or degenerative frequency modulated oscillator.

Another application of the present invention is in satellite communication systems. Here high modulation index transmissions are employed in the spacecraft links. The same information often interfaces to line of sight radio relay which employs a lower modulation index. This deviation changing technique can be used as a low distortion transform between the two system elements. The significant demodulation-remodulation distortions are removed as these elements are not included in the system.

SUMMARY OF THE INVENTION

The above objects, advantages and features of the present invention as well as others are achieved by providing a system for permitting modification of frequency deviation of F.M. and P.M. signals, said system comprising means for receiving an incoming signal having one value of frequency; means for separating the incoming signal into two parallel branches; means for delaying the signals in each of said branches for predetermined time intervals; means for mixing the incoming signal to each branch together with the delayed signal from the other branch; means for providing an output signal from said branches, said output signal being modified in frequency from the frequency of the incoming signal in accordance with the predetermined time intervals of said delay means; and feedback means from said output signal means to said incoming signal receiving means, said feedback means maintaining the incoming signal at a fixed amplitude level.

DESCRIPTION OF THE PREFERRED EMBODIMENTS

Figure 1:
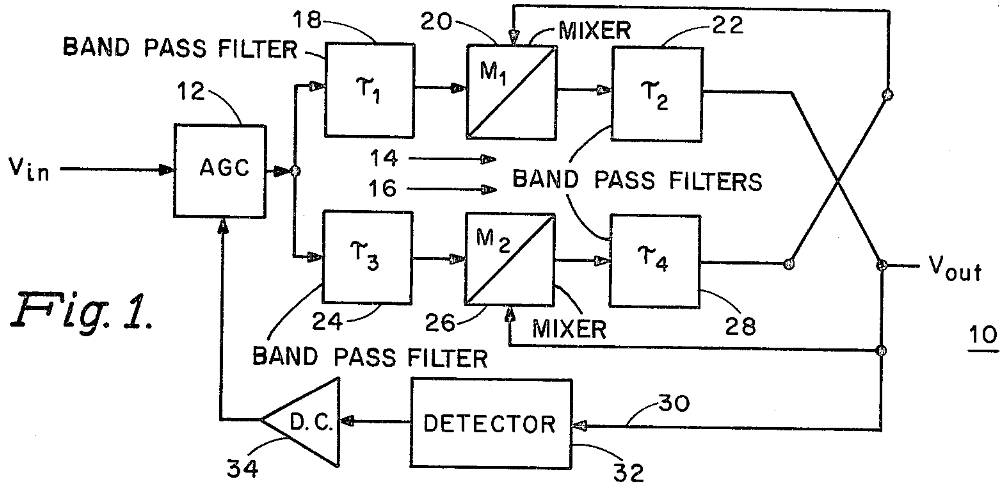
FIG. 1 is a block diagram of a generalized embodiment of the deviation modifier of the present invention.

FIG. 1 shows a block diagram of a deviation modifier 10 in accordance with the present invention. In modifier 10 input and output signals may be assumed to be:

$$V_{in} = \cos(\omega_1 t + \phi) \quad (1)$$

$$V_{out} = \cos(\omega_2 t + \theta) \quad (2)$$

This input signal is fixed in level by an automatic gain control circuit AGC 12 in order to maintain linear processing through the modifier 10. The signal from the AGC 12 is applied to two parallel branches 14 and 16. Branch 14 has a bandpass filter $\tau_1$ 18 whose output is fed to a mixer $M_1$ 20. The output of the $M_1$ mixer 20 is applied to another bandpass filter $\tau_2$. Branch 16 has a bandpass filter $\tau_3$ 24 whose output is applied to a mixer $M_2$ 26. The output of the $M_2$ mixer 26 is fed to another bandpass filter $\tau_4$ 28. The output from the $\tau_2$ filter 22 is mixed with the output from the $\tau_3$ filter 24 in the $M_2$ mixer 26 while the output from the $\tau_4$ filter 28 is mixed with the output from the $\tau_1$ filter 18 in the $M_1$ mixer 20. The output from the $\tau_3$ filter 22 is applied in a feedback loop 30 through a detector 32 and, D.C. amplifier 34 to the AGC circuit 12 to maintain a fixed amplitude input level.

In the operation of the deviation modifier 10 in FIG. 1, the bandpass filters 18, 22, 24 and 28 operate as delay lines. Since they are bandpass filters, they consider only the lower sidebands from the $M_1$ and $M_2$ mixers 20 and 26. The $\tau_1$ filter 18 provides a delay of $\tau_1$ while the $\tau_3$ filter 24 provides a delay of $\tau_3$ so that the result outputs from filters 18 and 24 are respectively:

$$\cos[\omega_1(t-\tau_1)+\phi] \quad (3)$$

$$\cos[\omega_1(t-\tau_3)\ 30\ \phi] \quad (4)$$

The $M_2$ mixer 26 mixes the output from the filter 24 given in equation 4 with the $V_{out}$ signal given in equation 2, resulting in the following output from the $M_2$ mixer 26:

$$\cos[(\omega_1-\omega_2)t-\omega_1\tau_3+\phi-\theta] \qquad (5)$$

The $\tau_4$ delay provided by filter 28 results in the signal:

$$\cos[(\omega_1-\omega_2)(t-\tau_4)-\omega_1\tau_3+\phi-\theta] \qquad (6)$$

The signal given in equation 6 reduces to:

$$\cos[(\omega_1-\omega_2)t-\omega_1\tau_4+\omega_2\tau_4-\omega_1\tau_3+\phi-\theta] \qquad (7)$$

The signal given in equation 7 is then mixed in mixer 20 with the delay signal from filter 18 given by equation 3 which results in the following output from the $M_1$ mixer 20:

$$\cos[\omega_2 t-\omega_1\tau_1+\phi+\omega_1\tau_4-\omega_2\tau_4+\omega_1\tau_3-\phi+\theta] \qquad (8)$$

which reduces to:

$$\cos[\omega_2 t-\omega_1\tau_1+\omega_1\tau_4-\omega_2\tau_4+\omega_1\tau_3+\theta] \qquad (9)$$

The signal given in equation (9) is then delayed $\tau_4$ by the filter 22 resulting in the output signal:

$$\cos[\omega_2 t-\omega_2\tau_2-\omega_1\tau_1+\omega_1\tau_4-\omega_2\tau_4+\omega_1\tau_3+\theta] \qquad (10)$$

which by assumption is equal to the output signal $V_{out}$ given in equation 2. Solving that equality:

$$-\omega_2\tau_2-\omega_1\tau_1+\omega_1\tau_4-\omega_2\tau_4+\omega_1\tau_3=0$$

$$\omega_1[\tau_4+\tau_3-\tau_1]=\omega_2[\tau_2+\tau_4] \qquad (11)$$

$$\omega_1/\omega_2=[\tau_2+\tau_4]/[\tau_3+\tau_4-\tau_1]$$

Therefore, by judiciously choosing the delay intervals provided by the filters 18, 22, 24 and 38, $\omega_2$ can be made to either be extended or reduced with respect to $\omega_1$. Modifier 10 thus permits F.M. or P.M. threshold extension or deviation reduction or expanding of an incoming signal to permit IF interfacing of signals without the necessity of demodulating and then remodulating the signals.

Figure 2:
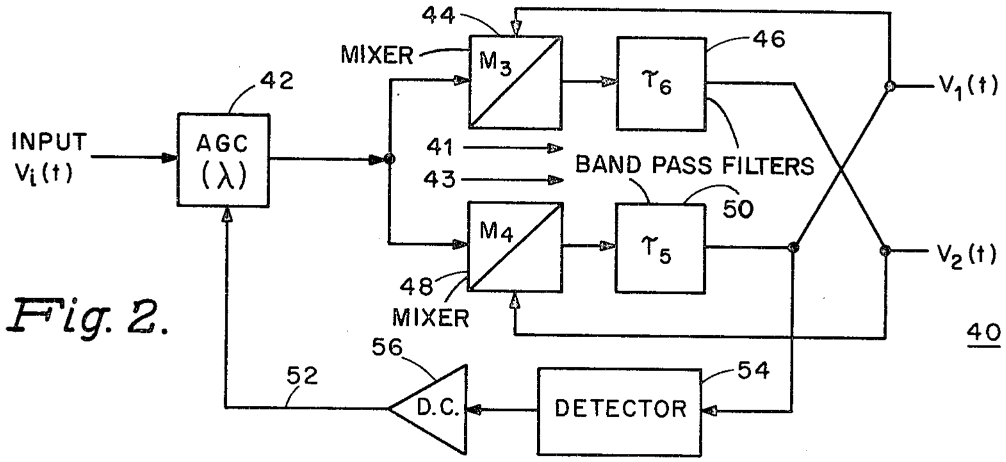
FIG. 2 is an embodiment of the present invention which provides only deviation reduction.

FIG. 2 is a block diagram of an embodiment of the present invention which provides only deviation reduction. An input signal is applied to a gain control circuit AGC 42 in order to maintain linear processing through the reducer 40. The signal from the AGC 42 is applied to two parallel branches 41 and 43. Branch 41 has a mixer $M_3$ 44. The output of the $M_3$ mixer 44 is applied to a bandpass filter $\tau_6$ 46. Branch 43 has a mixer $M_4$ 48. The output of the $M_4$ mixer 48 is fed to a bandpass filter $\tau_5$ 50. The output from the $\tau_6$ filter 46 is mixed with the input signal in the $M_4$ mixer 48 while the output from the $\tau_5$ filter 50 is mixed with the input signal in the $M_3$ mixer 44. The output from the $\tau_6$ filter 46 is also applied in a feedback loop 52 through a detector 54 and D.C. amplifier 56 to the AGC circuit 42. In the operation of the deviation reducer 40 is FIG. 2, the bandpass filters 46 and 50 operate as delay lines. Since they are bandpass filters, they consider only the lower sidebands from the $M_3$ and $M_4$ mixers 44 and 48.

If each mixer 44 and 48 provides the lower sideband, the phase of the two mixer inputs subtract. Since the reducer 40 is an oscillating loop (if the input level is high enough), it will operate in such a way as to maintain $2\pi n$ radians of phase shift around the loop. The frequencies of the output signal from filters 46 and 50 must always add up to the frequency of the input signal but the way they divide up is dependent on the delay values provided by filters 46 and 50. A derivation of the operation of the reducer 40 follows.

The input signal to deviation reducer 40 is fixed in level by the AGC 42 to maintain linear processing in the deviation reducer 40. If the following input is assumed:

$$V_i(t)=A\cos[\omega_o t+\phi(t)] \qquad (12)$$

and an output $$V_1(t)=B\cos[\omega_1 t+\theta(t)] \qquad (13)$$

then at the output of $M_3$ mixer 44 there is a lower sideband of:

$$\lambda/2\ AB\cos[(\omega_o-\omega_1)t+\phi(t)-\theta(t)]. \qquad (14)$$

After a delay of $\tau_6$ provided by the bandpass filter 46, the signal shown in equation 14 becomes $V_2$:

$$V_2=\lambda/2\ AB\cos[(\omega_o-\omega_1)(t-\tau_6)+\phi(t-\tau_6)-\theta(t-\tau_6)] \qquad (15)$$

The output given in equation 15 from filter 46 is applied to the $M_4$ mixer 48 where it is mixed with the input signal given in equation 12. The output of mixer 48 is then:

$$\lambda^2/4\ A^2B\cos[\omega_1(t-\tau_6)+\omega_o\tau_6+\phi(t)-\phi(t-\tau_6)+\theta(t-\tau_6)] \qquad (16)$$

After a delay $\tau_5$ in the bandpass filter 50, the signal shown in equation 16 becomes:

$$V_1=\lambda^2/4\ A^2B\cos[\omega_1(t-\tau_5-\tau_6)+\omega_o\tau_6+\phi(t-\tau_5)-\phi(t-\tau_5-\tau_6)+\theta(t-\tau_5-\tau_6)]$$

$$=B\cos[\omega_1 t+\theta(t)] \qquad (17)$$

Equation 17 yields:

$$\lambda^2A^2=4$$

$$\lambda=2/A \qquad (18)$$

$$\theta(t)=-\omega_1[\tau_5+\tau_6]+\omega_o\tau_6+\phi(t-\tau_5)-\phi(t-\tau_5-\tau_6)+\theta(t-\tau_5-\tau_6) \qquad (19)$$

The static and dynamic portions can be solved as follows:

$$\omega_1[\tau_5+\tau_6]=\omega_0\tau_6$$

$$\omega_1=\omega_o\tau_6/(\tau_5+\tau_6) \qquad (20)$$

$\omega_2$ the frequency of $V_2$ is given by:

$$\omega_2=\tau_5/(\tau_5+\tau_6) \qquad (21)$$

The dynamic terms require:

$$\theta(t)=\phi(t-\tau_5)-\phi(t-\tau_5+\tau_6)+\theta(t-\tau_5-\tau_6) \qquad (22)$$

The system function is then:

$$H(s)=e^{-\tau_1 s}\frac{1-e^{-\tau_2 s}}{1-e^{-(\tau_1+\tau_2)s}} \qquad (23)$$

for phase modulated signals. The first part of this expression can be ignored because it is simply a delay of $\tau_5$, and the system function for gain and phase calculation is:

$$H^1(s)=\frac{1-e^{-\tau_6 s}}{1-e^{-(\tau_5+\tau_6)s}} \qquad (24)$$

Taking $s=j\omega$ $$H^1(j\omega)=\frac{1-e^{-j\omega\tau_6}}{1-e^{-j\omega(\tau_5+\tau_6)}} \qquad (25)$$

The complex conjugate is:

$$H^{*1}(j\omega)=\frac{1-e^{+j\omega\tau_6}}{1-e^{+j\omega(\tau_5+\tau_6)}} \quad (26)$$

and thus the square of the gain is given by:

$$A^2(\omega)=H^1(j\omega)\cdot H^{*1}(j\omega)$$
$$=\frac{[1-e^{-j\omega\tau_6}]\,[1-e^{+j\omega\tau_6}]}{[1-e^{-j\omega(\tau_5+\tau_6)}]\,[1-e^{+j\omega(\tau_5+\tau_6)}]}$$
$$=\frac{\sin^2(1/2\omega^{\tau_6})}{\sin^2(1/2\omega(\tau_5+\tau_6))} \quad (27)$$

Thus, the amplitude response is:

$$A(\omega)=\sin ½\ \omega^{\tau_6}/\sin ½\ \omega^{(\tau_5+\tau_6)} \quad (28)$$

for phase modulation. For low values of $\omega^{(\tau_5+\tau_6)}$, equation 28 reduces to $$A(\omega)\approx\tau_6/(\tau_5+\tau_6) \quad (29)$$

The phase response is given by:

$$\phi^1(\omega)=\tan^{-1}\mathrm{Im}(H^1(j\omega))/\mathrm{Re}(H^1(j\omega)) \quad 30)$$

which after solving for the real and imaginary parts, yields $$\phi^1(\omega)=½\ \omega^{\tau_5} \quad (31)$$

Previously, a delay of $\tau_5$ was ignored and thus the phase characteristic of the system function for phase modulated signals is:

$$\phi(\omega)=3/2\ \omega \quad (32)$$

To normalize the derived formulas for plotting purposes, the following parameters will be used:

$$n=(\tau_5+\tau_6)/\tau_6 \quad (33)$$

$$f=\omega\ (\tau_5+\tau_6) \quad (34)$$

where $n$ is the deviation reduction ratio, while $f$ is the input modulation frequency normalized for a total loop delay of 1 second.

Thus, $$\omega\ \tau_5=f\,[(n-1)/n] \quad (35)$$

$$\omega\ \tau_6=f\,(1)/n \quad (36)$$

The amplitude and phase transfer functions are then given by:

$$A(f)=\sin(1/2n)f/\sin ½f \quad (37)$$

$$\phi(f)=3/2\,[(n-1)/n]f \quad (38)$$

Figure 3:
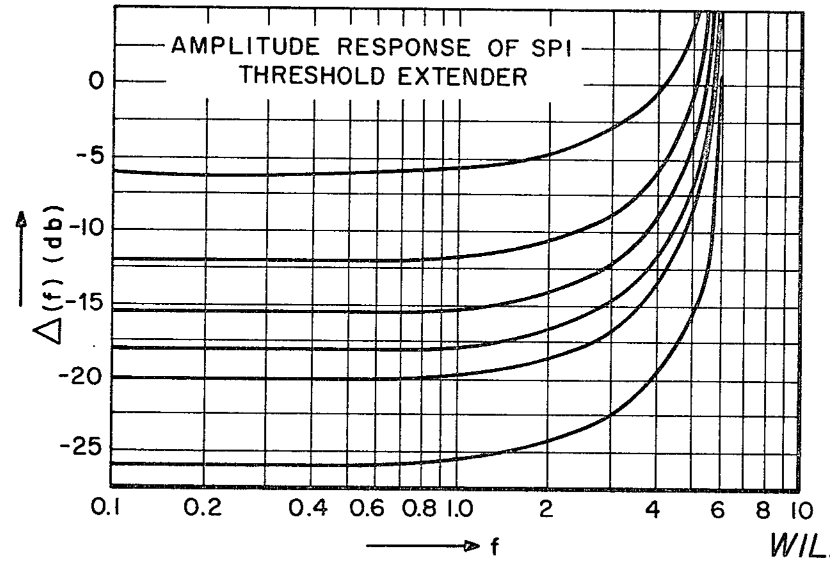
FIG. 3 is a plot of the amplitude response of the deviation reducer shown in FIG. 2.

The amplitude response slowly rises until $f\approx\pi$ where it rises asymptotically to infinity at $f=2\pi$. The phase response is simply a delay, and thus has no effect on the signal. FIG. 3 shows a plot of the amplitude response of the reducer 40 as a function of the input modulation frequency for various values of n. The response will be flat out of values of frequency on the order of:

$$\omega_{max}=1/(\tau_5+\tau_6) \quad (39)$$

In constructing a deviation reducer 40 as shown in FIG. 2, the choice of output frequencies can be arbitrary with respect to the amount of deviation reduction, since the delay and center frequency of a filter are independent. Effectively, a filter such as 46 and 50 looks like a delay plus a constant phase shift, thus introducing a constant into the preceding analysis. The effect of this constant phase shift is to change the operating center frequency, but will not affect the dynamic response of the deviation reducer 40.

Figure 4:
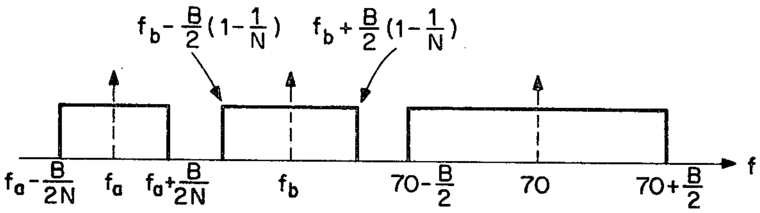
FIG. 4 is an example of a frequency plan showing the optimal frequencies to maximize available bandwidth.

The choice of frequencies cannot be entirely arbitrary, because the filters 46 and 50 must provide separation between signals. If filter 50 is made narrow with respect to filter 46 most of the deviation reduction will appear in output $V_1(t)$. Because it is easier to make narrow filters at lower frequencies, filter 50 is chosen such that its center frequency is lower than that of filter 46. It is useful to derive the optimal frequencies to maximize available bandwidth. $f_a$ is the center frequency of filter 50, $f_b$ is the center frequency of filter 46, $n$ is the deviation reduction factor, and $B$ is the maximum input signal bandwidth. FIG. 4 shows the frequency plan:

For maximum bandwidth, $$\left.\begin{aligned} f_a+\frac{B}{2N}&=f_b-\frac{B}{2}\left[1-\frac{1}{N}\right]\\ f_b+\frac{B}{2}\left[1-\frac{1}{N}\right]&=70-\frac{B}{2}\end{aligned}\right\}\text{To prevent overlap} \quad (40)$$

Assuming an input signal of 70 MHz, by definition $$f_a+f_b=70 \quad (41)$$

Simultaneous solution of the three equations gives $$B_{max}=140N/(5N-2) \quad (42)$$

$$f_a=70/(5N-2)\,[2N-1] \quad (43)$$

$$f_b=70/(5N-2)\,[3N-1] \quad (44)$$

where $N=$ $$\tau_5+\tau_6/\tau_6 \quad (45)$$

The table below shows optimal frequencies for various values of $n$.

| $n$ | $B$ | $f_a$ | $f_b$ |
|---|---|---|---|
| 2 | 35 | 26.2 | 43.8 |
| 4 | 31 | 27.2 | 42.8 |
| 6 | 30 | 27.5 | 42.5 |
| 8 | 29.5 | 27.6 | 42.4 |
| 10 | 29.2 | 27.7 | 42.3 |
| 20 | 28.6 | 27.9 | 42.1 |
| 00 | 28.0 | 28.0 | 42.0 |

Because of the frequency values being so close, 28 MHz and 42 MHz were chosen for $f_a$ and $f_b$ in tests of the deviation reducer in FIG. 2. This allows a maximum bandwidth of 28 MHz as $n$ gets large. For the tests, $\tau_5$ and $\tau_6$ were chosen to given $n=3$.

Figure 5A:
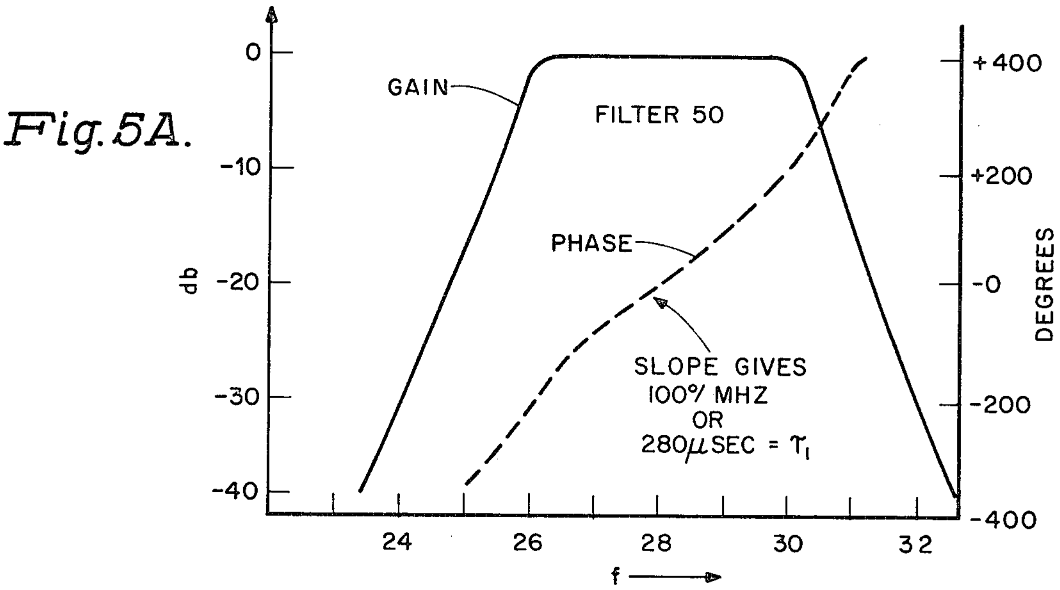
FIGS. 5A and B are plots of the amplitude and phase responses of the two filters $\tau_1$ and $\tau_2$ in FIG. 2.
Figure 5B:
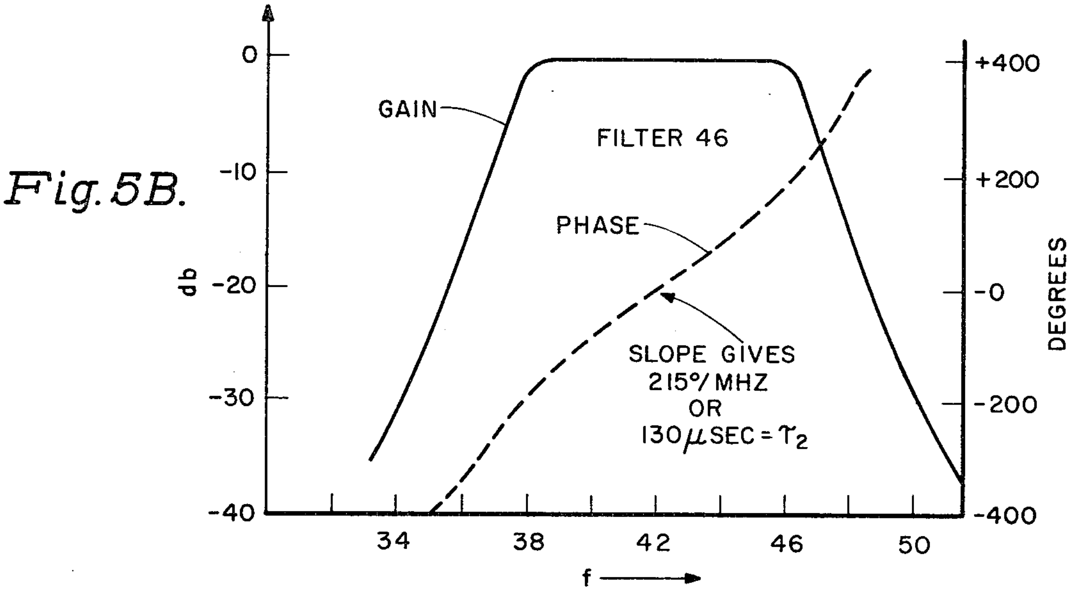

FIGS. 5A and B show the amplitude and phase responses of the two filters 50 and 46 respectively. Taking the slope of the phase curves gives a delay for filter 50 of 280 nanoseconds and a delay for filter 46 of 130 nanoseconds. The predicted deviation reduction is thus:

$$N=(\tau_1+\tau_2)/\tau_2=(280+130)/130=3.15$$

The deviation reduction of the reducer 40 was measured by using a 70 MHz IF input signal and connecting its output to a spectrum analyzer. A 100 KHz sine wave frequency modulation was then applied to the IF input and the modulation index adjusted to give the first carrier null in the spectrum. The 70 MHz IF signal was then connected directly to the spectrum analyzer, and the modulating frequency adjusted to again given the first carrier null. The ratio of new modulating frequency to 100 KHz gives the deviation reduction. The measured value turned out to be 3.3, giving a degree of prediction accuracy well within expectations. These tests indicated that the reducer 40 provides linear reduction without the necessity for demodulation. Therefore, there is no demodulator threshold to interfere with the operation of the reducer.

The technique of the present invention developed from the desire to use the regenerative synthetic phase isolator technology in a "threshold extension" FM receiver. The correlation bandwidth of this regenerative arrangement is under control of the designer as is the ratio of the time delay (slope of the phase characteristic). The noise bandwidth of the deviation reducer can be small, as in the conventional threshold extension receivers, without paying as great a penalty in signal distortion and capture. This is because the signal processor does not need to employ a saturating circuit such as a limiter, discriminator or degenerative frequency modulated oscillator.

Another application of the present invention is in satellite communication systems. Here high modulation index transmissions are employed in the spacecraft links. The same information often interfaces to line of sight radio relay which employs a lower modulation index. This deviation changing technique can be used as a low distortion transform between the two system elements. The significant demodulation-remodulation distortions are removed as these elements are not included in the system.

We claim

1. A system for permitting modification of frequency deviation of F.M. and P.M. signals, said system comprising:

means for receiving an incoming signal having one value of frequency;

means for separating the incoming signal into two parallel branches;

means for delaying the signals in each of said branches for predetermined time intervals;

means for mixing the incoming signal to each branch together with the delayed signal from the other branch;

means for providing an output signal from said branches, said output signal being modified in frequency from the frequency of the incoming signal in accordance with the predetermined time intervals of said delay means; and feedback means from said output signal means to said incoming signal receiving means, said feedback means maintaining the incoming signal at a fixed amplitude level.

2. A system as set forth in claim 1 wherein said means for delaying the signals are bandpass filters which consider only the lower sidebands of the signals and provide the predetermined time delay intervals.

3. A system for permitting modification of frequency deviation of F.M. and P.M. signals, said system comprising:

means for receiving an incoming signal having one value of frequency;

means for separating the incoming signal into two parallel branches;

first and second means in each branch for delaying the signals in each of said branches for predetermined time intervals;

means in each branch for mixing the signal from said first delay means in that branch with the signal from the second delay means in the other branch;

means for providing an output signal from said branches, said output signal being modified in frequency from the frequency of the incoming signal in accordance with the predetermined time intervals of said delay means; and feedback means from said output signal means to said incoming signal receiving means, said feedback means maintaining the incoming signal at a fixed amplitude level.

4. A system for permitting modification of frequency deviation of F.M. and P.M. signals, said system comprising:

means for receiving an incoming signal having one value of frequency;

means for separating the incoming signal into two parallel branches;

one of said branches including a first delay means for delaying the incoming signal a predetermined time, a mixing means to which the output of said first delay means is applied and a second delay means for delaying the signal from said mixing means a predetermined time;

the other of said branches including a first delay means for delaying the incoming signal a predetermined time, a mixing means to which the output of said first delay means is applied and a second delay means for delaying the signal from said mixing means a predetermined time;

said output from said second delay means of said one branch being mixed in said mixing means of said other branch with the signal from said first delay means of said other branch while said output from said second delay means of said other branch is mixed in said mixing means of said one branch with the signal from the first delay means of said one branch;

means for providing an output signal from said branches, said output signal being modified in frequency from the frequency of the incoming signal in accordance with the predetermined time intervals of said delay means; and feedback means from said output signal means to said incoming signal receiving means, said feedback means maintaining the incoming signal at a fixed amplitude level.

5. In combination:

a first mixing means;

a second mixing means;

first means for coupling an input signal to said first mixing means and to said second mixing means;

second means for coupling an output signal of said second mixing means to said first mixing means; and third means for coupling an output signal of said first mixing means to said second mixing means, said third coupling means delaying said output signal of said first mixing means, said first mixing means providing its output signal by mixing the signals coupled thereto by said first and said second coupling means, said second mixing means providing its output signal by mixing together the signals coupled thereto by said first and said third coupling means, and one of said signals coupled by said second and said third coupling means serving as an output signal of said combination.

6. The combination according to claim 5 wherein said second coupling means delays said output signal of said second mixing means, and wherein said first coupling means delays said input signal coupled to said first mixing means relative to said input signal coupled to said second mixing means.

7. The combination according to claim 6 wherein said first coupling means includes gain control means responsive to said output signal of said combination for modifying the magnitude of said input signal in accordance with the magnitude of said output signal of said combination.

* * * * *

UNITED STATES PATENT OFFICE
CERTIFICATE OF CORRECTION

Patent No. 3,706,946 Dated December 19, 1972

Inventor(s) William J. Bickford and Richard G. Cease

It is certified that error appears in the above-identified patent and that said Letters Patent are hereby corrected as shown below:

Column 2, line 63, "$\cos[\omega_1(t-\tau_3)\ 30\ \phi]$" should read -- $\cos[\omega_1(t-\tau_3) + \phi]$ --.

Column 4, line 17, "$[\omega_0 - \omega_1)$" should read -- $[(\omega_0 - \omega_1)$ --.

Column 5, line 15, "$\sin 1/2\ \tau_6$" should read -- $\sin 1/2\ \omega\tau_6$ --.

Column 5, line 17, " $(\tau_5 + \tau_6$ " should read -- $(\tau_5 + \tau_6)$ --.

Column 5, line 33, "$\phi(\omega) = 3/2\omega$" should read -- $\phi(\omega) = 3/2\omega^5$ --.

Signed and sealed this 8th day of January 1974.

(SEAL)
Attest:

EDWARD M.FLETCHER,JR.
Attesting Officer

RENE D. TEGTMEYER
Acting Commissioner of Patents

FORM PO-1050 (10-69)

USCOMM-DC 60376-P69
☆ U.S. GOVERNMENT PRINTING OFFICE : 1969 O—366-334